United States Patent
Fukasawa

(10) Patent No.: US 6,615,363 B1
(45) Date of Patent: Sep. 2, 2003

(54) OPTICAL DISK AND METHOD OF RECORDING ON THE SAME

(75) Inventor: Minoru Fukasawa, Ibaraki-ken (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/527,989

(22) Filed: Mar. 17, 2000

(30) Foreign Application Priority Data

Mar. 19, 1999 (JP) .......................................... 11-074945

(51) Int. Cl.[7] .......................... G06F 11/00; G11C 29/00
(52) U.S. Cl. ........................................ 714/5; 711/134
(58) Field of Search ............................ 714/5, 3, 6, 7, 714/8, 13, 27, 42, 43, 48, 54; 711/133, 134, 163

(56) References Cited

U.S. PATENT DOCUMENTS

| | | | | |
|---|---|---|---|---|
| 4,984,230 A | * | 1/1991 | Satoh et al. ................... 369/54 |
| 5,283,790 A | * | 2/1994 | Kawashita ................... 371/101 |
| 5,422,871 A | * | 6/1995 | Nakashima et al. .......... 369/47 |
| 6,208,802 B1 | * | 3/2001 | Mori et al. ................... 386/96 |
| 6,279,118 B1 | * | 8/2001 | Kang ............................. 714/7 |
| 6,292,625 B1 | * | 9/2001 | Gotoh et al. .................. 386/95 |
| 6,385,736 B1 | * | 5/2002 | Jeong et al. ................... 714/8 |
| 6,408,408 B1 | * | 6/2002 | Ko ............................. 714/710 |

FOREIGN PATENT DOCUMENTS

| | | |
|---|---|---|
| JP | A63113979 | 5/1988 |
| JP | A4 13276 | 1/1992 |
| JP | A554547 | 3/1993 |
| JP | 11165925 | 6/1999 |

* cited by examiner

*Primary Examiner*—Nadeem Iqbal
(74) *Attorney, Agent, or Firm*—Birch, Stewart, Kolasch & Birch, LLP

(57) ABSTRACT

An optical disk and method of recording information on the same are provided in which music and images such as, motion pictures can be recorded without dropout of information by more reducing the time necessary to replace than in the prior art. On this optical disk are provided a plurality of management areas, of which one or a plurality of the management areas are located between the innermost and outermost peripheries and are used for storing replacement information. Therefore, the optical head need not be moved to the innermost or outermost periphery at the time of replacement unlike the prior art.

12 Claims, 7 Drawing Sheets

| | REPLACEMENT SOURCE | | REPLACEMENT DESTINATION | |
|---|---|---|---|---|
| | TRACK | SECTOR | TRACK | SECTOR |
| 1 | | | | |
| 2 | | | | |
| ⋮ | ⋮ | ⋮ | ⋮ | ⋮ |
| n | | | | |

OPTICAL DISK AND METHOD OF RECORDING ON THE SAME

BACKGROUND OF THE INVENTION

The present invention generally relates to optical disks, and particularly to an optical disk having a novel format and a method of recording information on the same. That is, the present invention relates to a technology suitable for the format specifications of the next-generation rewritable optical disks such as MO, ASMO, MD-DATA, DVD-RAM and PD.

Magnetooptical disks, such as ASMO (Advanced Storage Magnetooptical Disk) each have a storage capacity of 6 GB or more, and the user can freely write information on these disks. A typical one of these disks has record management areas provided along the innermost and outermost peripheries of the disk with respect to its radius direction (across the tracks), and a plurality of bands provided between those peripheries. The record management areas are sometimes called a lead-in area and a lead-out area. The outermost and innermost peripheries are assigned to the lead-in and lead-out areas or to the lead-out and lead-in areas, respectively. This assignment is selective and depends on the specifications to be used.

The record management areas are prepared for the recording and reproducing system for the whole disk, the positional information of data area (for example, replacement area information which will be described later) and the other management information (for example, security data), and they are used only by the manufacturers, or cannot be changed by the user. The management information has so far been redundantly recorded in the two innermost and outermost record management areas in order to increase the reliability, and further recorded typically doubly even in one record management area. As a result, one management information has been quadruply recorded in the innermost and outermost record management areas. The reason was that when a disk was corroded by rust, the innermost or outermost record management area was empirically often all disabled.

The user can make access to each band which is composed typically of a data area and a replacement area. The data area is a area in which the user records certain data. The replacement area has replacement blocks stored for defective blocks (sectors) present in the data area. Therefore, if the data area includes no defective block, no data is written in the replacement area. The addresses in the replacement area are written in the above-mentioned record management areas.

The ASMO has sectors of the same length in order to record each track at a substantially constant density. Since the length of the circumference (in the sector direction) increases as we go from the inner to outer periphery of the disk, the number of sectors per circumference increases as we go from the inner to outer periphery of the disk. Each band is conceptually composed of one data area and one replacement area corresponding thereto. As the methods of arranging the sectors (physical format), there are known three kinds of systems: CLV (Constant Linear Velocity), CAV (Constant Angular Velocity) and ZCAV (Zone Constant Angular Velocity). For example, in the CAV or ZCAV system, the revolution velocity (angular velocity) is substantially constant in the inner and outer peripheries, and the synchronizing clock frequency for recording and reproduction is changed. For the ASMO, a CLV system is employed in which the rotation velocity is changed, and the clock frequency is constant.

SUMMARY OF THE INVENTION

In the conventional ASMO, if a defective block is found present in the data area and replaced by the replacement area during recording, the optical head is required to move to the innermost or outermost record management area and write this information therein. However, since three different rotation rates are assigned to the innermost and outermost peripheries and the corresponding band, large power is necessary to control a driving motor to drive for the writing. In addition, since the optical head is forced to move from the corresponding band to the innermost or outermost record management area, it takes a time to access. Thus if, for example, music or images (for example, motion pictures) to be continuously recorded were recorded on the ASMO, the information was sometimes partially not recorded due to the necessary access time at the replacement time, and the recording operation was stopped at that time. This trouble was not peculiar to the CLV system. Even if the CATV or ZCAV system were employed, the optical head had to move to the innermost or outermost recording area at the replacement time, and thus similarly it took a long time to access.

Accordingly, it is a general object of the present invention to provide a novel and useful optical disk and method of recording information on the same with the above problems solved.

Specifically, it is an object of the invention to provide an optical disk and method of recording information on the same in which the necessary time for the replacement is made shorter than in the prior art so that music and images (for example, motion pictures) can be recorded without dropout of information.

It is another object of the invention to provide an optical disk and method of recording information on the same in which the power necessary for the replacement time can be decreased as compared with that in the prior art when the CLV system is employed for a physical format.

It is still another object of the invention to provide an optical disk and method of recording information on the same in which the reliability of the replacement information can be maintained high and/or improved.

According to a first aspect of the invention, there is provided an optical disk formatted to have a record management area in which management information can be stored and of which the contents cannot be rewritten by the user, a data area to which the user can make access, and a replacement area capable of providing replacement blocks for defective blocks that exist in the data area, the record management area being provided at three or more locations on the optical disk so that different contents of the management information can be respectively stored in the management areas located at the different places.

The conventional optical disk has two record management areas respectively provided along the innermost and outermost peripheries, the two management areas having stored therein the same information. The optical disk according to the first aspect of the invention provides a novel format in place of the conventional one. That is, the optical disk according to this aspect has three or more record management areas on the disk, and these management areas are capable of storing different management information depending on the locations at which the management areas are provided. Therefore, the contents of the management information can be divided into a plurality of different information and disposed in different places in order that the management information cannot be lost and that predetermined processes can be well conducted. The management information includes one to promote that, for example, the moving time of the head can be reduced in the record processing or replacement processing and that the number of times the revolution rate of the disk or the clock frequency is changed can be decreased. In an example of the optical disk according to this aspect of the invention, although the management information of at least two areas of the three or more record management areas are different, the management information of all the three management areas may be the same. For example, in another example of this aspect, during the recording processing only the central management area is accessed and updated in its contents, and after the recording operation ends and before the power is turned off the management information in the central management area is copied into the other management areas.

According to a second aspect of the invention, there is provided an optical disk according to the first aspect of the invention, wherein the management information stored in the record management areas has first management information including a recording system for the overall disk, and second management information including address information of both defective blocks and replacement blocks, and the record management areas have first management areas located along the innermost and outermost peripheries of the optical disk to store the first management information, and a second management area located between the innermost and outermost peripheries of the optical disk to store the second management information. Thus, in an optical disk according to this aspect, the management information is the separated, or first and second management information, the first management area and the second management area are separated, and the second management information is stored between the innermost and outermost peripheries. Since the optical head is usually located between the innermost and outermost peripheries when the second management information is accessed to, the moving time of the optical head can be reduced as compared with that in the conventional optical disk in which the second management information is stored along the innermost and outermost peripheries. The second management area may be provided in one place or in a plurality of places together with all data area between the innermost and outermost peripheries.

According to a third aspect of the invention, there is provided an optical disk according to the second aspect, further including a plurality of bands each including a data area and a replacement area, the second management area being provided in the band of the corresponding data area. Thus, in the optical disk according to this aspect, the second management area and the optical head to access it normally exist in the same band. As a result, the moving distance of the optical head can be further reduced.

According to a fourth aspect of the invention, there is provided an optical disk according to the second aspect, wherein the first management area can also store the second management information. Thus, the optical disk according to the fourth aspect can store the second management information redundantly in a plurality of, for example, three or more, places on the disk.

According to a fifth aspect of the invention, there is provided an optical disk formatted to have a record management area in which first management information including a recording system for the overall disk can be stored and of which the contents cannot be rewritten by the user, a data area to which the user can make access, and a replacement area capable of providing replacement blocks for defective blocks that exist in the data area, the record management area being provided along the innermost and outermost peripheries of the optical disk, part of the data area having stored therein second management information including address information of both the defective blocks and the replacement blocks for replacing the defective blocks. Thus, in the optical disk according to the fifth aspect, since the second management information and the optical head to access this information exist together in the same or adjacent areas, the moving distance of the optical head can be reduced more than that in the conventional optical disk. Although the second management information can be accessed by the user, it can be selectively processed on a software basis not to be changed.

According to a sixth aspect of the invention, there is provided a method of recording on an optical disk, comprising the steps of reading a first management area provided along the innermost and outermost peripheries of the optical disk between which a data area and a replacement area are also provided, said first management area having stored therein first management information including a recording system of the overall disk; reading a second management area provided between the innermost and outermost peripheries of the disk and having stored therein second management information including address information of both defective blocks and replacement blocks for replacing the defective blocks; and writing certain data in the data area and the replacement area of the optical disk on the basis of the second management area. The recording method according to the sixth aspect proposes a novel starting up process for reading the second management area located in the innermost and outermost peripheries at the starting up time before data is recorded in the data area and replacement area.

According to a seventh aspect of the invention, there is provided a method of recording on an optical disk, comprising the steps of writing certain data in a data area of the optical disk that has provided, between the innermost and outermost peripheries of the disk, the data area to which the user can make access, and a replacement area and provided, along the innermost and outermost peripheries, a first management area having stored therein first management information including a recording system for all the disk; writing the certain data in a replacement block of the replacement area of the optical disk when a defective block exists in the data area; and writing address information of both the defective block and the replacement block as second management information in a second management area located between the innermost and outermost peripheries. Thus, in the recording method according to the seventh aspect, the second management information is recorded in the second management area between the innermost and outermost peripheries at the replacement time.

According to an eighth aspect of the invention, there is provided a method according to the seventh aspect, wherein the step of writing in the second management area uses a different revolution rate of the disk from that in writing in the first management area. Thus, according to the eighth aspect, the number of times the revolution rate of the disk is changed at the replacement time can be reduced more than in the conventional optical disk.

According to a ninth aspect of the invention, there is provided a method according to the seventh aspect, wherein the step of writing in the second management area uses a different clock frequency from that in writing in the first management area. Thus, according to the ninth aspect, the number of times the clock frequency is changed at the clock replacement time can be reduced as compared with that in the conventional optical disk. This aspect enables the optical disk using CAV system or ZCAV system to be used.

According to a tenth aspect of the invention, there is provided a method according to the eighth aspect, wherein the step of writing in the second management area uses the same revolution rate of the disk as that in writing in the data area in which the defective block exists. Thus, according to the tenth aspect, when the data area and replacement area corresponding to the second management area are located within the same band, it is not necessary to change the revolution rate of the disk at the replacement time.

According to an eleventh aspect of the invention, there is provided a method of recording on an optical disk, comprising the steps of reading a first management area located along the innermost and outermost peripheries of the optical disk that also has a data area and a replacement area provided between the innermost and outermost peripheries, the first management area having stored therein first management information including a recording system of all the disk and second management information including address information of both defective blocks and replacement blocks for replacing the defective blocks; writing certain data in the data area of said optical disk on the basis of the first management information; writing the certain data in the replacement blocks of the replacement area of the optical disk when the defective blocks exist in the data area; writing the second management information associated with the defective blocks and the replacement blocks in a second management area provided between the innermost and outermost peripheries; and copying the second management information written in the second management area into the first management area after the certain data is written in the data area and the replacement area and before the operation of recording on the optical disk is finished, thereby updating the second management information in the first management area. Thus, according to the eleventh aspect, when the starting-up is performed before recording is made in the data area and replacement area, the first management areas located in the innermost and outermost peripheries are accessed for reading, and at the replacement time the second management information is stored in the second management area between the innermost and outermost management peripheries.

According to a twelfth aspect of the invention, there is provided an optical disk according to the first aspect, wherein the data area, the replacement area and the record management area arranged in this order are included between the two other record management areas. Thus, according to the twelfth aspect, when a defective block occur, the optical head is moved in a direction from the data area to replacement area, making a replacement processing, while the head is moved to update the record management area in the same direction.

According to a thirteenth aspect of the invention, there is provided an optical disk according to the second aspect, wherein the second management information further includes information regarding inspection, security, replacement system and/or attribute of the data area. For example, the second management information can include one or a plurality of information items of the presence or absence of surface inspection (certify), kinds of certify, the presence or absence of security flag that allows only a particular user to access, history such as the number of times the user made initialization and attributes such as rewritable type or write once type.

According to a fourteenth aspect of the invention, there is provided an optical disk formatted to have a record management area in which management information can be stored and of which the contents cannot be rewritten by the user, a data area to which the user can make access, and a replacement area capable of providing a replacement block for replacing a defective block that exists in the data area, the record management area being provided at three locations on the optical disk, the three record management areas being capable of storing different contents of the management information according to the locations, a plurality of sets of the data area and the corresponding replacement area adjacent thereto being provided between the two record management areas close to each other. Thus, according to the fourteenth aspect, the defective block present in the data area and replacement block in the replacement area can be located close to each other.

According to a fifteenth aspect of the invention, there is provided a method according to the seventh aspect or eleventh aspect, wherein the second management information further includes information regarding inspection, security, replacement system and/or attribute of the data area. For example, the second management information can include one or a plurality of information of the presence or absence of surface inspection (certify), kinds of surface inspection, the presence or absence of security flag that allows only a particular user to access, history such as the number of times the user made initialization and attributes such as rewritable type or write once type.

Further objects, other features and advantages of the invention will be apparent from the detailed description of the invention taken in conjunction with the accompanying drawings.

DESCRIPTION OF THE EMBODIMENTS

An embodiment of an optical disk format of the invention will be described with reference to FIG. 1. Here, FIG. 1 is a plan view of an optical disk 100 concerning the innermost to outermost peripheries of part of the disk 100, showing an embodiment of the invention.

Figure 1:
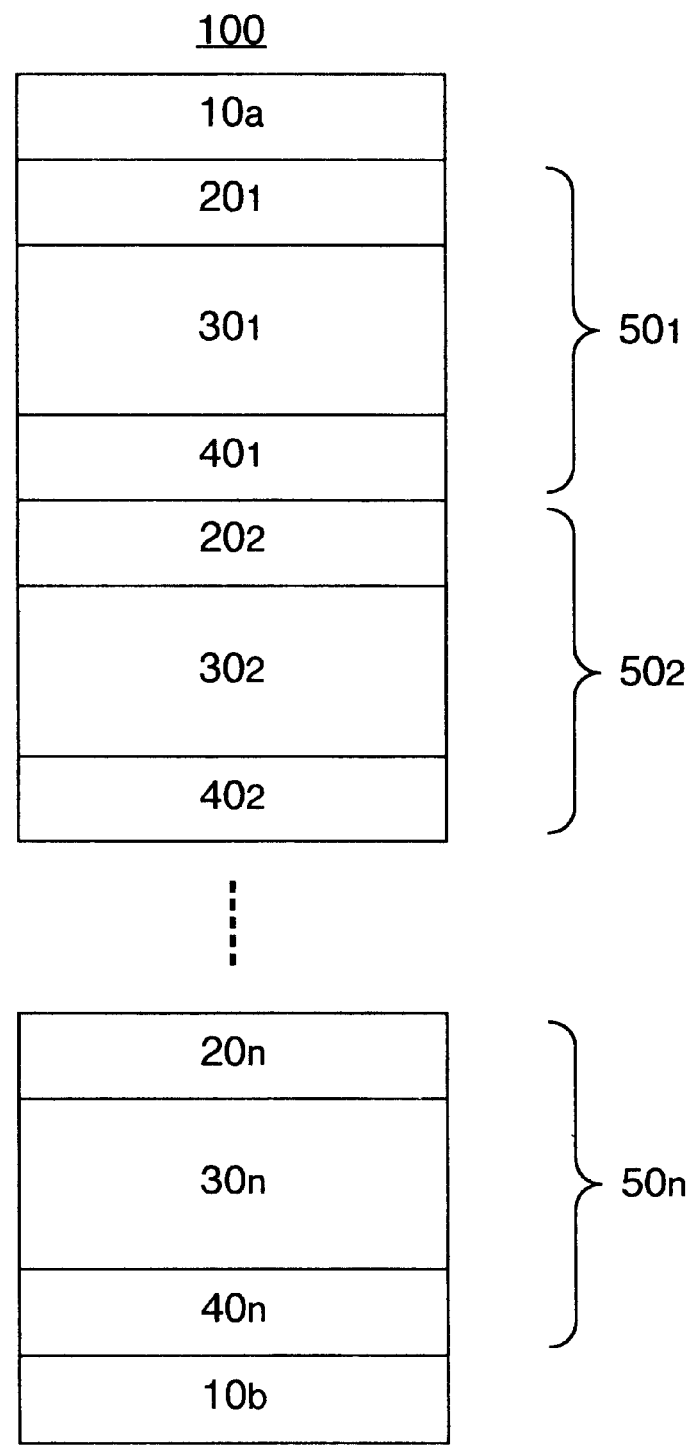
FIG. 1 is a partially plan view of an optical disk according to one embodiment of the invention.

Referring to FIG. 1, the blocks called sectors are arranged in the lateral direction, and the tracks in the longitudinal direction. The optical disk 100 according to the invention can be suitably applied to a rewritable optical disk such as the next generation MO, ASMO, MD-DATA, DVD-RAM or PD having a new format.

As illustrated in FIG. 1, the optical disk 100 of this embodiment is formatted to have a management area 10a located in the innermost periphery, a management area 10b located in the outermost periphery, and a plurality of bands (bands 1 through N) $50_1$ through $50_n$ (hereinafter, generally referred to as "band 50" for convenience of explanation) located between the innermost and outermost peripheries. Each band $50_1$ through $50_n$ has a management area $20_1$ through $20_n$ (hereinafter, generally referred to as "management area 20"), a data area $30_1$ through $30_n$ (hereinafter, generally referred to as "data area 30"), and a replacement area $40_1$ through $40_n$ (hereinafter, generally referred to as "replacement area 40").

Figure 7:
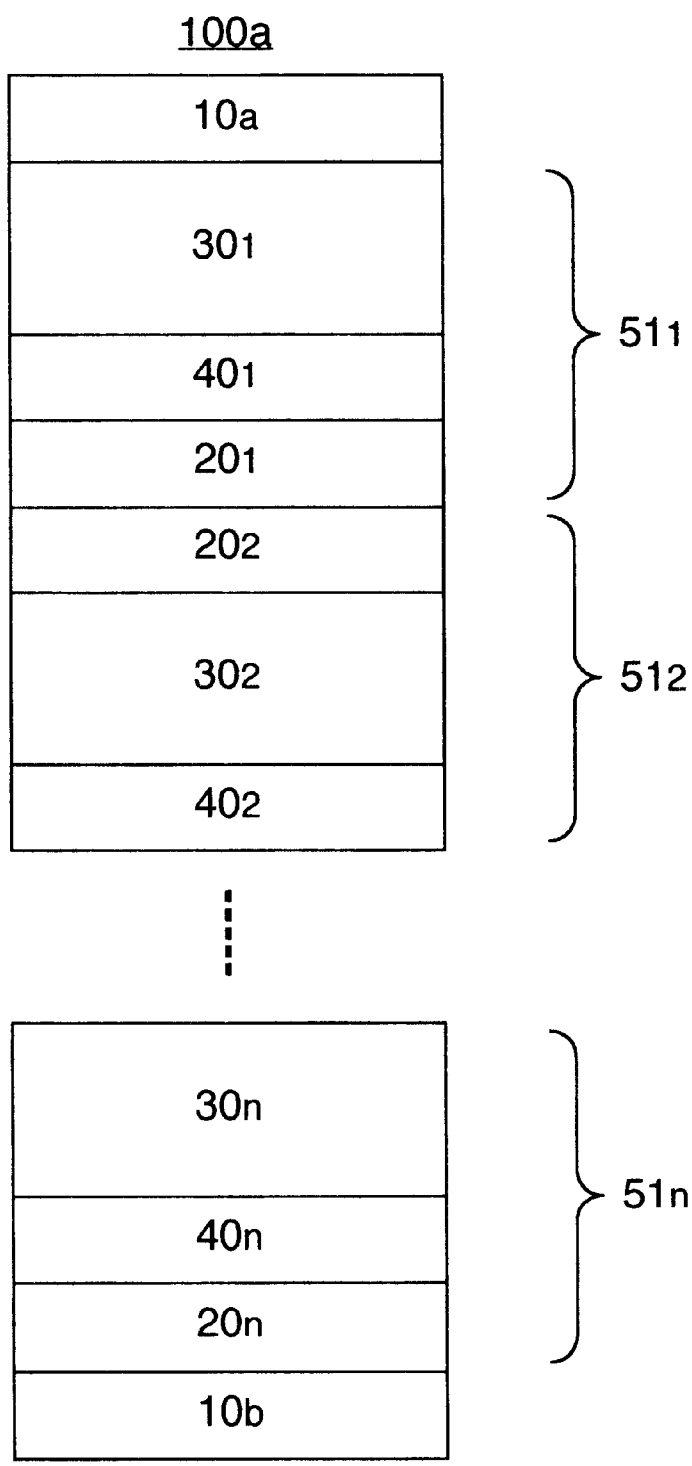
FIG. 7 is a partially plan view of a modification of the optical disk shown in FIG. 1.
Figure 8:
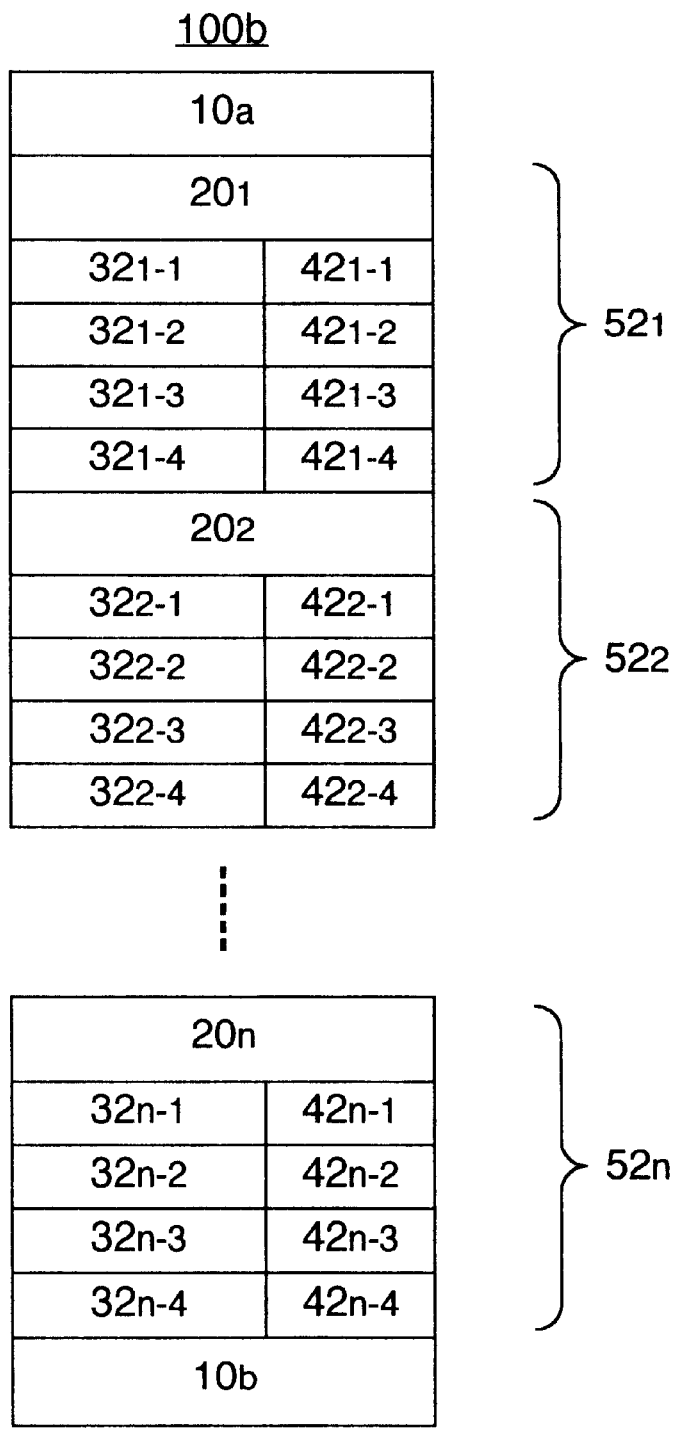
FIG. 8 is a partially plan view of another modification of the optical disk shown in FIG. 1.

In FIG. 1, although either one of the management areas 10a and 10b (hereinafter, generally referred to as "management area 10") may be a lead-in area or a lead-out area of recording unit, the innermost management area 10a in this embodiment is assumed to be the lead-in area from which the optical head not shown starts to record on the optical disk 100. In addition, although each band has a management area 20, a data area 30 and a replacement area (region) 40 in turn from the innermost to outermost periphery, this arrangement order is an example. As, for example, shown in FIG. 7, as a modification of this embodiment, the data area 30, replacement area 40 and management area 20 may be arranged in this order on an optical disk 100a which will be described later. Alternatively, as shown in FIG. 8 as a modification of this embodiment, a plurality of sets of data areas $32_{1-1}$ through $32_{n-4}$ (hereinafter, generally referred to as "data area 32") and replacement areas $42_{1-1}$ through $42_{n-4}$ (hereinafter, generally referred to as "replacement area 42") may be arranged in turn between the adjacent management areas 20 on an optical disk 100b which will be described later. Further alternatively, these structures mentioned above may be mixed in each band.

Each management area 10 has the same management information including information of a recording system of the whole disk, information of each area such as band number, band position, position of management area 20, position of data area 30 and position of replacement area 40, and security information of disk. In other words, the management area 10 has stored therein at least management information of the whole disk. Redundantly storing the same management information, or storing the same management information in each management area 10 can increase the reliability of the management information. The management information may be redundantly recorded in a multiple way within the same management area 10. Thus, if each management area 10 stores management information doubly, the same management information can be stored in four areas on the optical disk 100. Other management information including replacement information such as address information of defective blocks and replacement blocks may be selectively stored in the management areas 10a and 10b as will be described later. In this case, however, the management areas 10a and 10b cannot be rewritten by the user.

This embodiment employs the CLV system as an example on the optical disk 100. A constant revolution rate is used within each band 50, but different revolution rates are used in different bands 50. The CLV system is well known by those skilled in the art, and thus will not be described here in detail. Each band 50 includes data area 30 and replacement area 40 to which the user can make access. The user of optical disk 100 can record desired data such as, for example, software program, documents, music, images, motion pictures and supervisory data in data area 30 by use of a method known by those skilled in the art.

The replacement area 40 provides a replacement block for a defective block (sector) if it is present. Therefore, if no defective block is present, the management area stores no replacement block information.

Usually, if a defective block is found in data area 30 at the initial examination time before the manufacturer delivery products, the defective block can be replaced by the block next to the defective block, or attached with the address thereof since no data is stored in data area 30. This replacement information is stored in the management area 10. The initial examination is also called the surface inspection (certify), in which data is tentatively written on the surface of optical disk 100 and then read therefrom, thereby testing if there is any data error. The certify, test actually includes various kinds of tests. For example, data is tentatively written on the entire surface of the optical disk 100 or written on the surface at predetermined intervals. The certify and even SDL (Secondary Defect List) that will be described later suppose that the optical disk 100 includes defective blocks, and can arbitrarily set even byte number that is to be registered as defective blocks. For example, error of three bytes is not regarded as presence of error. Therefore, this replacement scheme has no relation with replacement area 40. The replacement scheme is generally known as PDL (Primary Defect List).

When a defective block occurs in data area 30 while the user is using the optical disk 100, the replacement area 40 provides a replacement block. This replacement scheme is generally known as SDL. In this embodiment, the management area 20 that will be described below has management information of SDL stored, and may further have PDL stored.

In this embodiment, the management area 20 cannot be rewritten by the user. However, in an alternative example, the management area 20 is formed as part of data area 30. If the user freely changes its contents, the recorded replacement information is changed so that the information recorded in the data area 30 and replacement area 40 is substantially lost. Thus, proper software should be provided in order that the management area 20 can be accessed to and read, but cannot be changed by the user. The management area 20 has stored therein as management information the defective block addresses of data area 30 and replacement block addresses of replacement area 40 that are provided in the corresponding band 50. In an alternative example, one or a plurality of management areas 20 can be provided between the innermost and outermost peripheries of the disk.

The conventional optical disks such as MO had the management area 20 provided as part of management area 10, or provided in the two innermost and outermost management areas of the optical disk. As will be described later, if a replacement block is assigned as a result of occurrence of a defective block while the optical head is writing desired data in data area 30, the optical head writes replacement information in the management area 20 at the replacement time. In the conventional optical disk, however, the optical head was required to move to the innermost and outermost management areas, and thus it took a long time to move.

The management area 20 is able to selectively store the other management information of the data area 30. In this embodiment, the management areas 10a and 10b are particularly effective for increasing the reliability against the event when they do not store management information including replacement information, or address information of defective blocks and replacement blocks or when information cannot be read from all management area 10 because of rust or the like. The other management information can include the presence or absence of certify, employed certify system such as setting conditions of kinds and byte number of allowable defective blocks, security information such as, for example, the presence or absence of security flag for allowing only a particular user to access, replacement scheme such as, for example, the scheme disclosed in Japanese Patent Application No. 11-165925 filed by the present assignee on Jun. 11, 1999, history information such as, for example, the number of times the user initialized the optical disk 100, and attribute of data area 30 such as flags for setting write once type and rewritable type. As a result, different displacement management, security management and record management can be performed for each band.

According to the optical disk 100 of the invention, since the management area 20 even in any embodiment and modifications described above is located between the innermost and outermost peripheries, the distance between the optical head and the management area 20 and hence the moving time are shorter than those of the prior art. Moreover, in this embodiment, since the optical head is required to make access only to one management area 20 but not necessary to access both the innermost and outermost management areas unlike the prior art, the access time is further decreased. In addition, since this embodiment provides the management area 20 in the same band as the corresponding data area 30 and replacement area 40, the disk driving motor not shown need not change the revolution speed of the disk. In the conventional CLV-type optical disk, the motor needed to change the revolution speed of the disk when the optical head writes replacement information in the innermost and outermost management areas, and thus it took time and power to change. The optical disk 100 of this embodiment can save the power for the motor and further decrease the time of writing by the optical head.

The format on an optical disk 100a shown in FIG. 7 (hereinafter, generally referred to as "optical disk 100") has bands $51_1$ through $51_n$ (hereinafter, referred to as "band 51" in which the data area 30, replacement area 40 and management area 20 are arranged in this order. Here, FIG. 7 is a partially plan view of a modification of the optical disk shown in FIG. 1. The structure of the band 51 is such that when a defective block occurs, the optical head moves in a direction to make replacement from the data area 30 to replacement area 40 and to update the record management area. Therefore, the optical disk 100a can further decrease the distance that the optical head moves and reduce the time in which the optical head writes.

The format of an optical disk 100b (hereinafter, generally referred to as "optical disk 100") shown in FIG. 8 has provided in each of bands $52_1$ through $52_n$ a plurality of sets of data area 32 (hereinafter, generally referred to as "data area 30") and the corresponding replacement area 42 (hereinafter, generally referred to as "replacement area 40"), the data area 32 and replacement area 42 of each set being attached with the same suffix such as $32_{1-1}$, $42_{1-1}$. Here, FIG. 8 is a partially plan view of another modification of the optical disk shown in FIG. 1. The structure of the band 52 is such that the distance between the data area 32 and replacement area 42 is generally shorter than that between the data area 30 and replacement area 40 shown in FIG. 1. Therefore, when a defective block occurs, the optical disk 100b allows the optical head to move a further shorter distance and write in a further shorter time.

If a defective block occurs several bytes after the first byte of the data area 30 shown in FIG. 1, the optical head moves a relatively long distance to the replacement block, and thus the format shown in FIG. 1 is not suited to data such as motion picture data that requires fast processing. The optical disk 100b shown in FIG. 8, as described previously, supposes that defective blocks naturally occur, and it is sure to assign replacement area 42 a certain number of bytes after the data area 32, thereby making fast replacement processing on the data area.

In this modification, the replacement area 42 corresponding to the data area 32 has divided areas, which are provided within the same band 52. If the word "band" is considered as divided areas, it seems that the replacement areas 42 corresponding to the data areas 32 belong to different bands. In addition, it also seems that, for example, a set of data area $32_{1-1}$ and replacement area $42_{1-1}$ and a set of data area $32_{1-2}$ and replacement area $42_{1-2}$ belong to different bands. However, actually the data area $32_{1-1}$ and replacement area $42_{1-1}$ are located within the same band, and a set of the data area $32_{1-1}$ and replacement area $42_{1-2}$ and a set of the data area $32_{1-2}$ and replacement area $42_{1-2}$ are located within the same band. In other words, the divided areas within each band 52 in FIG. 8 do not indicate bands for physical partitions of recorded regions. If the bands indicating the physical partitions of recorded regions are called physical bands, the divided areas within each band 52 in FIG. 8 will be logic bands. The physical bands (bands 52 in FIG. 8) have features that the numbers of blocks of the respective bands in the circumferential direction are different and/or that the recording frequencies for the respective bands are different. As to the logic bands each of which is formed of a few MB (megabyte) units, having replacement information for each logic band reduces the utilization efficiency of optical disk 100b. On the other hand, the replacement management by management areas 10 in the inner and outer peripheries delays the replacement processing. Thus, this embodiment provides one management area 20 for a plurality of logic bands.

The optical disks 100, 100a and 100b can be selectively used in accordance with the kinds of data stored in the data area 30. For example, the optical disk 100 is used for photographic image data, optical disk 100a for music data, and optical disk 100b for motion picture data.

Figure 2:
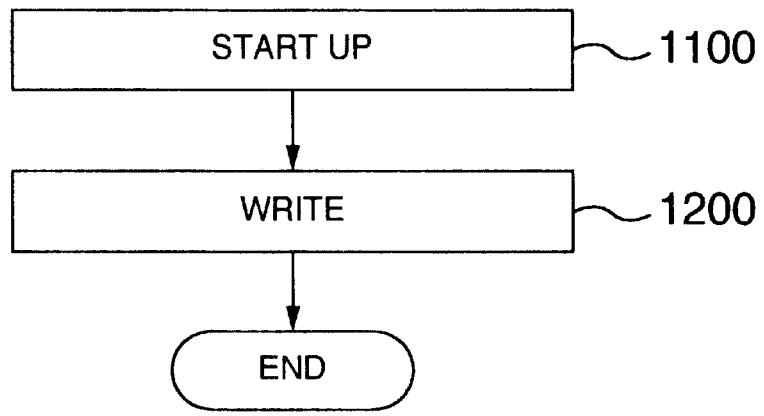
FIG. 2 is a flowchart showing a recording method of the embodiment.
Figure 3:
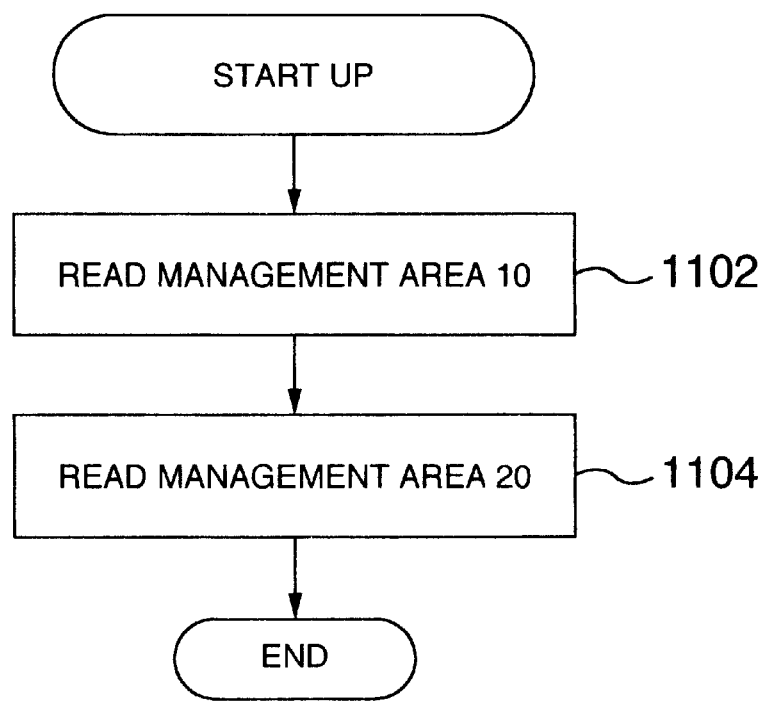
FIG. 3 is a flowchart showing the starting up process shown in FIG. 2.

How the user records desired data on optical disk 100 of FIG. 1 will be described with reference to FIGS. 2 through 5. FIG. 2 is a flowchart showing an example of the recording method of this embodiment. FIG. 3 is a detailed flowchart showing the starting step in FIG. 2. The recording process shown in FIG. 2 includes a starting up step 1100 and a writing step 1200. In an alternative example of this embodiment which will be described later, the recording method of the invention can add a copy step 130.

The starting up process 1100 in FIG. 2 includes, as shown in FIG. 3, a read step 1102 of reading the management area 10 and another read step 1104 of reading the management area 20 of each band 50 ("band 50" generally includes "band 51"). The starting up process means that when the optical disk 100 is inserted into a disk drive shown later, the preprocessing for the recording process is automatically performed only once in principle irrespective of the data which the user is going to record.

At step 1102, the management area 10a and/or management area 10b are read out. Thus, the optical disk in the disk drive makes access to the management area 10a and/or 10b. If either one of the management areas cannot be read due to the fact that the disk is corroded by rust, the other management area is invariably accessed by the optical head. If either management area is read, the other management area need not be read. In addition, if the management information is recognized by finding from one of the management areas having redundant management information, you may selectively omit reading the same redundant information from the other areas.

The read management information is stored in a memory, for example, a RAM, not shown, of the disk drive. The selectively read management information is also stored in a memory, for example, a RAM of a personal computer connected to the disk drive. If necessary, security check such as ID or PIN check may be performed on the basis of the management information. As a result of step 1102, it is recognized how the disk drive controls the optical disk 100. Reading the management area allows the disk drive to detect the kind of optical disk (for example, 100, 100*a*, 100*b*).

Figures 4, 6:
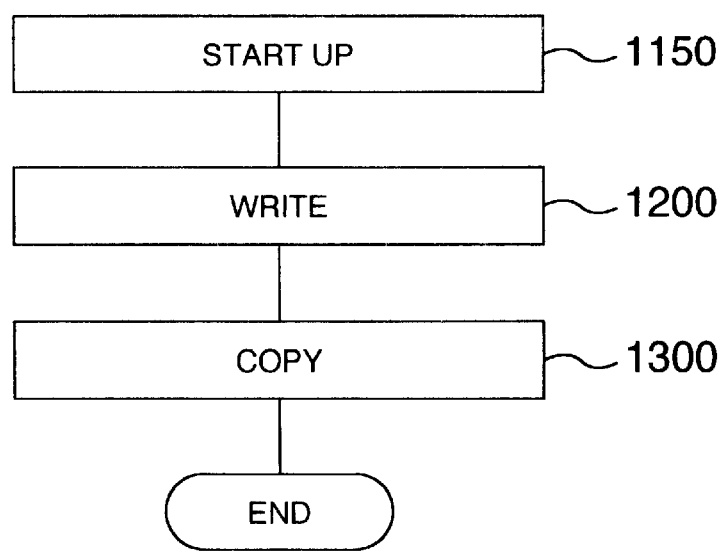
FIG. 4 is one example of a replacement information table generated by the processes shown in FIG. 3.
FIG. 6 is a flowchart showing a modification of the recording method of FIG. 2.
Figure 5:
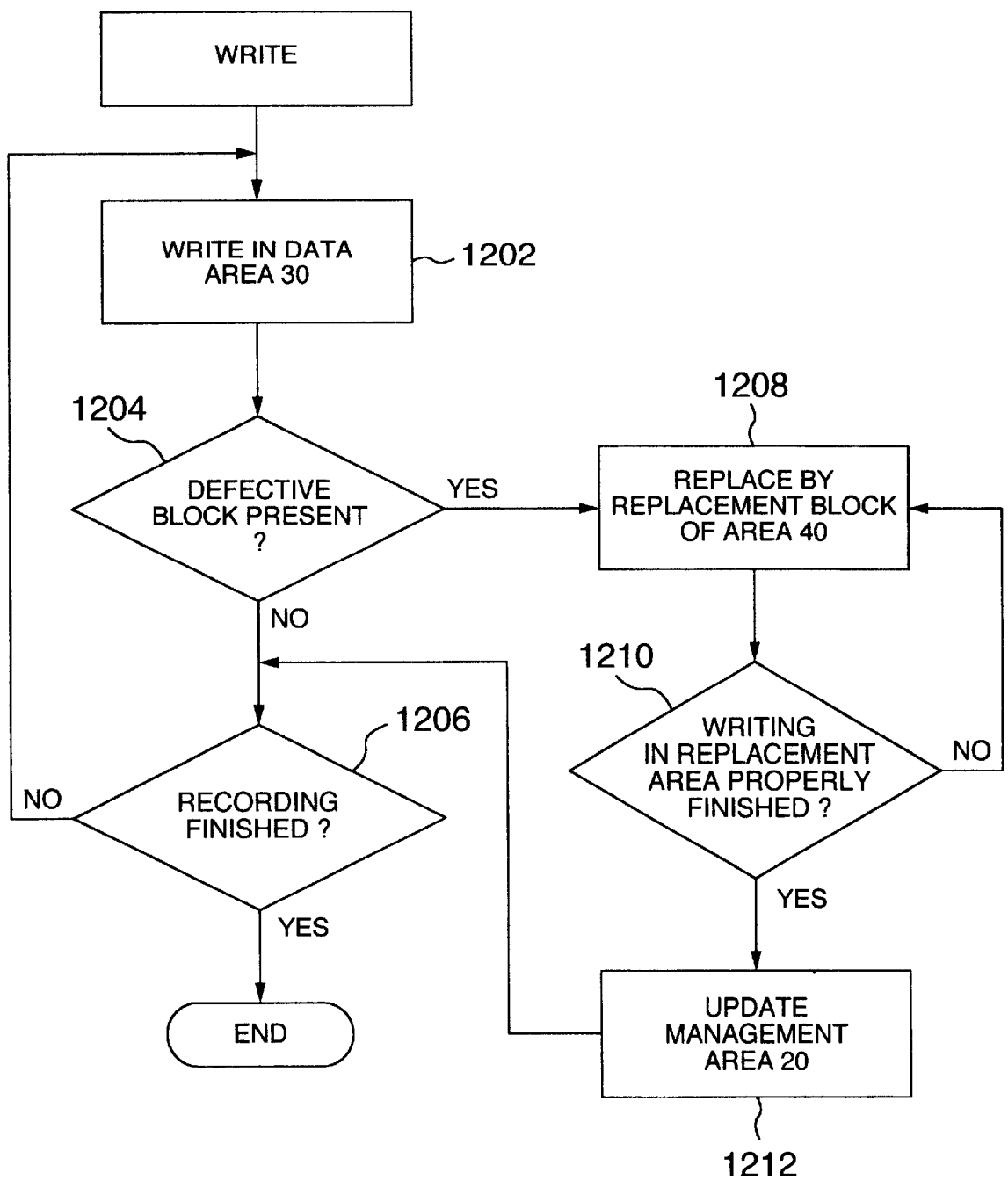
FIG. 5 is a flowchart showing the write process shown in FIG. 2.

Then, at step 1104, the management area 20 located in each band 50 is read out. Thus, the optical head makes access to all the management areas 20 to read them on the basis of the addresses of the management areas 20 that are included in the management information read from the management area 10. In order to read each management area 20, it is necessary to change the revolution rate of the disk by the driving motor not shown. Accordingly, a replacement information table for specifying addresses of the defective blocks of replacement sources and replacement blocks of replacement destinations as for example shown in FIG. 4 is created in the memory not shown of the disk drive. When the management area 20 includes replacement address information and additional management information as described above, these other management information are of course stored in the memory of the disk drive.

At step 1200, writing is performed. In this writing process, the user records desired data in the data area 30 and complementarily in the replacement area 40. The writing step 1200 shown in FIG. 2 will be mentioned in detail with reference to FIG. 5. First, the user writes data in data area 30 (at step 1202). Then, if a defective block is not found within data area 30 at step 1204, decision is made of if all data has been written (at step 1206). If all data has been written, the process ends. If all data is not written yet, the writing operation continues.

If a defective block is found at step 1204, the defective block is assigned to a replacement block of the replacement area 40 (at step 1208). Although replacement blocks are assigned to defective blocks in the address order in principle, a desired-address replacement block may be allotted to the defective block for the sake of security or other reasons. If it is decided at step 1210 that the defective block has been normally written in the corresponding replacement block, the address information of the defective block and replacement block are written as management information in the management area 20, thereby updating the previous management information (step 1212). In the optical disk 100*a* shown in FIG. 7, the optical head at step 1208 is moved from the data area 30 to replacement area 40 in the same direction as the optical head at step 1212 is moved from the replacement area 40 to management area 20, and thus the time of writing by the optical head can be further reduced.

Then, data is similarly recorded from the sector of the next address to the defective block, of data area 30. However, if it is decided at step 1210 that the writing in the corresponding replacement block is not normally finished yet, the next replacement block is assigned at step 1208 since the corresponding replacement block is also a defective block. This subroutine is continued until the correct, or defect-free replacement block is found. In this case, the sector of the replacement source to be written in the management area 20 is not a defective replacement block, but a defective block of data area 30.

Since the optical head can make access to the management area 20 in a short time and update it at step 1212, even music or motion picture information which the user writes as desired data can be continuously recorded successfully without interrupting or stopping the recording. In addition, the step 1212 does not need to change the revolution rate of the disk.

The operation of a modification of the recording method shown in FIG. 2 will be described with reference to FIG. 6. The recording process shown in FIG. 6 has a starting step 1150, a writing step 1200 and a copying step 1300. In this modification, the management area 10 also has stored therein the management information of management area 20. Therefore, the starting step 1150 needs to only head the management area 10. That is, since the step 1104 shown in FIG. 3 is not necessary to execute, the starting up time can be reduced. In addition, since the management information stored in the management area 20 is redundantly recorded in the management area 10, it is possible to increase the reliability of the management information stored in management area 20. The writing step 1200 is the same as that in FIG. 2, and thus will not be described.

At copying step 1300, the management information updated in each management area 20 is automatically written in the management area 10 after the end of the recording operation. Thus, the management area 10 substantially stores the replacement information table shown in FIG. 4.

While an embodiment and its modifications have been described so far, the present invention is not limited to those, but can take various changes and modifications without departing from the scope of the invention. For example, the optical disk 100 may employ CAV system or ZCAV system, and in this case the clock frequency is changed instead of changing the revolution rate of the disk. It will be understood that the format according to the invention can be used also where the recording layer is a multilayer. The format generation step program for the recording method may be implemented by the computer of the recording system in the form of a computer-readable recording medium such as a semiconductor memory or disk medium on which the program is stored.

Figure 9:
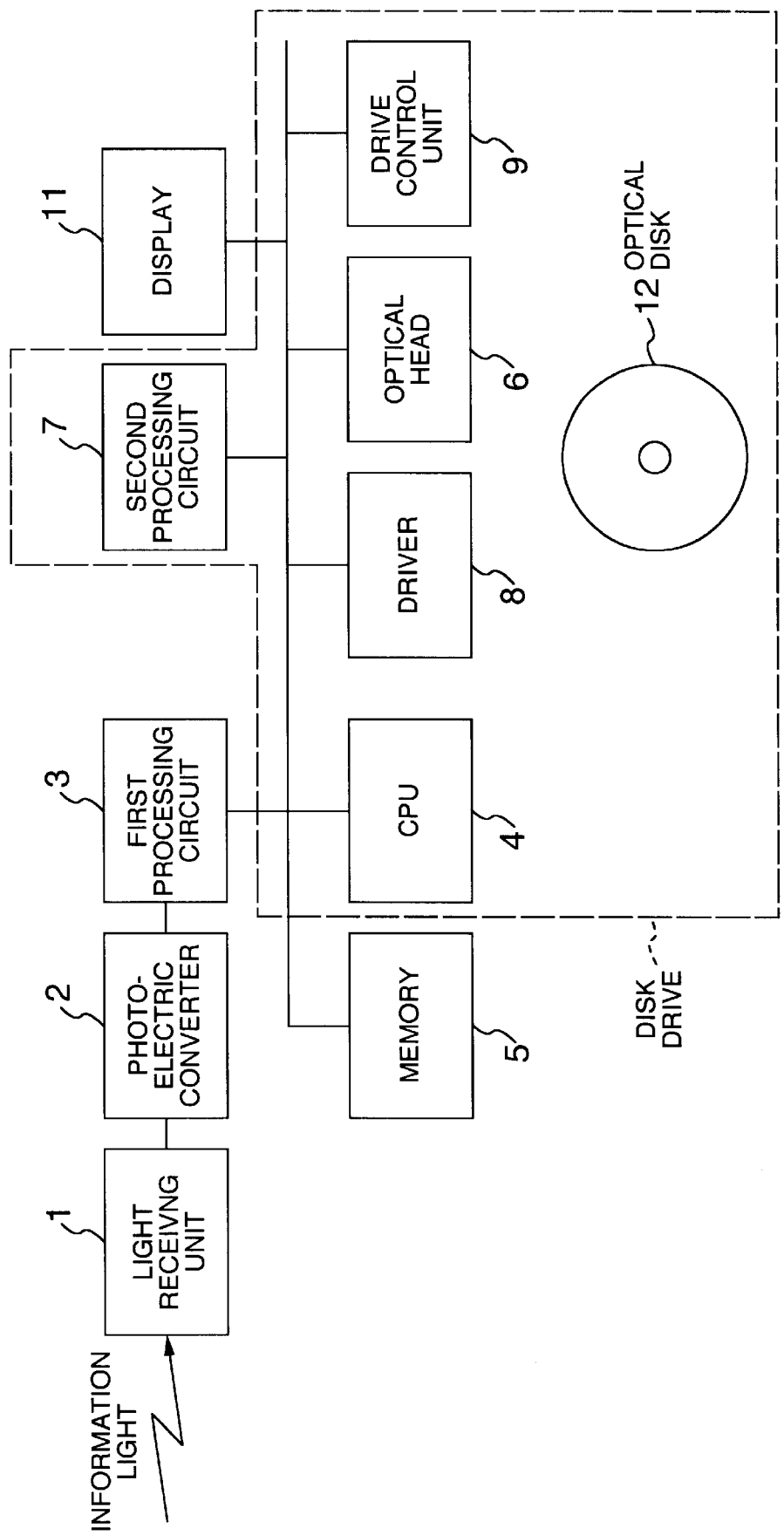
FIG. 9 is a circuit block diagram showing an example of a digital camera system to which an optical disk drive according to the present invention is applied.

Now an embodiment of a digital camera to which an optical disk drive according to the present invention is applied will be described with reference to FIG. 9. FIG. 9 is a circuit block diagram showing the conception of a digital camera. The digital camera includes a light receiving unit 1 with a photo-sensor, a photo-electric conversion unit 2, a first signal processing circuit 3, a CPU, a memory 5, an optical head 6, a second signal processing circuit 7, a disk driver 8 adapted with an optical disk 12, a drive control unit 9, and a display 11.

The CPU 4 functions to control the operation of respective elements of the digital camera. An image information is received by the light receiving unit 1 through its lens in the form of a light signal. When a camera shutter is depressed, the photo-electric conversion unit (CCD) 2 converts the incident light into an electrical signal depending upon the color tone and intensity of the light. The first signal processing circuit 3 digitizes the converted image signal into a code signal through data compression. The memory 5 stores the code signal representing the image information. The optical disk 12 is rotated by a driving motor of the disk driver 8. The drive control unit 9 functions to position the optical head 6 at a predetermined position on the optical disk 12.

In writing the image information on the optical disk, the UPU 4 controls the drive control unit 9 so as to emit a laser light, and controls the memory 5 to read data of the image information therefrom. Then, the second signal processing unit 7 functions to modulate the emitted laser light with the read image data in respect of the intensity and width of the emitted laser pulse. As a result, the read image data is converted to a modulated laser light. The modulated laser light is recorded on the optical disk 12 through the optical head 6. The information recording on the optical disk thus described is implemented uniquely in using the disk formatting specifically embodied above in accordance with the present invention.

In reading image information from the optical disk, the CPU 4 controls the drive control unit 9 to move the optical head 6 at a predetermined position on the optical disk 12. The heads irradiates the disk surface with a laser light and the light receiving unit 1 receives the irradiated laser light reflected from the recording surface of the optical disk 12. The second signal processing circuit 7 converts the received reflection light into an electrical signal to produce image information. The image information thus converted is displayed on the display 11 such as a LCD monitor in the form of a picture image.

The effects of the invention will be described below by way of example.

The optical disk according to the first aspect of the invention proposes a novel format that can replace the conventional format. In this optical disk, since the management information can be divided into a plurality of portions and located in a plurality of places on the disk in order that the management information can be prevented from being lost and can be conveniently used for certain processes, the reliability of the management information can be maintained high and the processes using the management information can be conveniently and satisfactorily performed. For example, by properly providing the management area at certain locations on the disk in order to reduce the moving time of the head in the recording or replacement process, it is possible to successfully record data of music and images without dropout of information. Moreover, by similarly providing the management area in order to promote the decrease of the number of times the revolution rate of the disk or clock frequency is changed in the recording or replacement process, it is possible to save power and time for the alteration. Thus, according to this aspect of the invention, although the management information at least at two locations of three or more locations include different portions, the management information at three or more locations may be all the same. Even if the management information in all management areas are the same, the optical disk having three or more record management areas, according to the first aspect of the invention, is more reliable than the conventional optical disk.

In the optical disk according to the second aspect of the invention that subordinates to the first aspect, since the second management information and the optical head that accesses that information are both located between the innermost and outermost peripheries of the disk, in addition to the effects of the first aspect the moving distance of the optical head can be reduced as compared with that in the conventional optical disk on which the second management information is provided along the innermost and outermost peripheries. Therefore, data of music and images can be successfully recorded without dropout of information.

In the optical disk according to the third aspect of the invention that subordinates to the second aspect, since the second management area and the optical head that accesses that area are usually located in the same band, in addition to the effect of the second aspect the moving distance of the optical head can be further reduced as compared with that in the second aspect. Thus, data of music and images can be recorded more accurately and successfully without dropout of information.

In the optical disk according to the fourth aspect of the invention that subordinates to the second aspect, the second management information can be provided redundantly at a plurality of locations on the disk. Since three or more management areas are provided, the second management information can be stored at three or more locations. Since the second management information is redundantly recorded on the disk, the reliability of the second management information can be increased.

In the optical disk according to the fifth aspect of the invention, since the second management information and the optical head that accesses that information are both located in the same or adjacent areas, the moving distance of the optical head can be reduced as compared with that in the conventional disk on which the second management information is provided along the innermost and outermost peripheries. Thus, data of music and images can be successfully recorded without dropout of information.

The optical disk recording method according to the sixth aspect of the invention proposes a novel starting up process for reading the second management area located between the innermost and outermost peripheries at the time of starting up before recording is made in the data area and replacement area. Although the recording method according to the sixth aspect requires to access the first and second management areas at the time of starting up, the access time necessary for the replacement process can be reduced as compared with that in the prior art. Therefore, in the recording method according to this aspect, the time for replacement process can be reduced the more, the more the number of replacement blocks increases, as compared with that in the conventional recording method in which the management areas along the innermost and outermost peripheries are accessed for each replacement.

In the optical disk recording method according to the seventh aspect of the invention, the second management information is recorded at the time of replacement in the second management area between the innermost and outermost peripheries. Since the second management information and the optical head that accesses it are both located between the innermost and outermost peripheries, the moving distance of the optical head can be reduced as compared with that in the conventional optical disk on which the second management information is located along the innermost and outermost peripheries. Thus, data of music and images can be successfully recorded in the data area and replacement area without dropout of information.

In the recording method according to the eighth aspect of the invention, in addition to the effect of the seventh aspect, the number of times the revolution rate of the disk is changed at the time of replacement can be reduced as compared with that in the conventional optical disk. Thus, the recording method according to this aspect can save the power of the motor for rotating the disk as compared with the prior art.

In the recording method according to the ninth aspect of the invention, in addition to the effect of the seventh aspect, the number of times the clock frequency is changed at the time of replacement can be reduced as compared with that in the conventional optical disk. Thus, the recording method according to this aspect can reduce the time for changing the frequency as compared with the prior art. This aspect of the invention enables the invention to be applied to the optical disk using CAV system or ZCAV system.

In the recording method according to the tenth aspect of the invention, since the revolution rate of the disk is not necessary to change at the time of replacement, more saving can be achieved than in the eighth aspect.

In the optical disk recording method according to the eleventh aspect, the first management area provided between the innermost and outermost peripheries is accessed to and read at the time of starting up, and the second management information is recorded in the second management area between the innermost and outermost peripheries at the time of replacement. Since the method according to this aspect can maintain the starting up time substantially the same as in the prior art, and reduce the access time in which the optical head accesses the second management area at the time of replacement, data of music and images can be successfully recorded without dropout of information. In addition, since the second management information is redundantly recorded in a plurality of places, the reliability can be increased.

In the optical disk according to the twelfth aspect of the invention, when a defective block occurs the optical head is moved from the data area to replacement area in order to make replacement processing, and it is moved in the same direction in order to update the record management area. Thus, the moving distance of the optical head can be reduced, and the writing time can be decreased.

In the optical disk according to the thirteenth aspect of the invention, since the second management information includes management information other than the address information for replacement, particularly the reliability can be increased against the events that the other management areas do not store these information and that reading is disabled by rust or the like. In addition, it is possible to perform replacement management, security management and recording management which are different depending upon a different band.

In the optical disk according to the fourteenth aspect of the invention, since the defective block that exists in the data area and the replacement block in the replacement area can be placed close to each other, the time necessary for replacement processing can be reduced.

In the optical disk according to the fifth aspect of the invention, since the second management information includes management information other than the replacement address information, particularly the reliability can be increased against the events that the other management areas do not store these information and that reading is disabled by rust or the like. In addition, it is possible to perform replacement management, security management and recording management different for each band.

What is claimed is:

1. An optical disk formatted to have:
    a record management area in which management information can be stored and of which the contents cannot be rewritten by the user;
    a data area to which the user can make access; and
    a replacement area capable of providing replacement blocks for defective blocks that exist in said data area, said record management area being provided at three or more different locations on said optical disk so that different contents of said management information can be respectively stored in said management areas located at the different locations,
    wherein said management information stored in said record management areas have first management information including a recording system for all said disk, and second management information including address information of both said defective blocks and said replacement blocks, and said record management areas have first management areas located adjacent the innermost and outermost peripheries of said optical disk to store said first management information, and a second management area located between said innermost and outermost peripheries of said optical disk to store said second management information.

2. An optical disk according to claim 1, said format further comprising a plurality of bands each having said data area and said replacement area, said second management area being provided in said band of the corresponding data area.

3. An optical disk according to claim 1, wherein said first management area can also store said second management information.

4. A method of recording data on an optical disk comprising the steps of:
    writing certain data in a data area of said optical disk that has provided between the innermost and outermost peripheries of said disk said data area to which the user can make access, and a replacement area, and provided adjacent said innermost and outermost peripheries a first management area having stored therein first management information including a recording system for all said disk;
    writing said certain data in a replacement block of said replacement area of said optical disk when a defective block exists in said data area; and
    writing address information of both said defective block and said replacement block as second management information in a second management area located between said innermost and outermost peripheries.

5. A method according to claim 4, wherein said step of writing in said second management area uses a different revolution rate of said disk from that in writing in said first management area.

6. A method according to claim 4, wherein said step of writing in said second management area uses a different clock frequency from that in writing in said first management area.

7. A method according to claim 5, wherein said step of writing in said second management area uses the same revolution rate of said disk as that in writing in said data area in which said defective block exists.

8. A method of recording data on an optical disk comprising the steps of:
    reading a first management area located adjacent the innermost and outermost peripheries of said optical disk that also has a data area and a replacement area provided between said innermost and outermost peripheries, said first management area having stored therein first management information including a recording system of all said disk and second management information including address information of both defective blocks and replacement blocks for replacing said defective blocks;
    writing certain data in said data area of said optical disk on the basis of said first management information read from said first management area;
    writing said certain data in said replacement blocks of said replacement area of said optical disk when said defective blocks exist in said data area;

writing said second management information associated with said defective blocks and said replacement blocks in a second management area provided between said innermost and outermost peripheries; and copying said second management information written in said second management area into said first management area after said certain data is written in said data area and said replacement area and before the operation of recording on said optical disk is finished, thereby updating said second management information in said first management area.

9. A method according to claim 4, wherein said second management information further includes information of inspection, security, replacement system and/or attribute of said data area.

10. An optical disk formatted to have:

a record management area in which management information can be stored and of which the contents cannot be rewritten by the user;

a data area to which the user can make access; and a replacement area capable of providing replacement blocks for defective blocks that exist in said data area, said record management area being provided at three or more different locations on said optical disk so that different contents of said management information can be respectively stored in said management areas located at the different locations, wherein said management information stored in said record management areas has first management information including a recording system of all said disk, and second management information including address information of both said defective blocks and said replacement blocks, and said record management areas are respectively provided at least adjacent the innermost and outermost peripheries of said optical disk as first and second management areas for storing said first management information, and between said innermost and outermost peripheries of said disk as a third management area for storing said second management information.

11. A computer-readable recording medium storing therein a program for implementing an optical disk recording method according to claim 4, by a computer.

12. A method according to claim 8, wherein said second management information further includes information of inspection, security, replacement system and/or attribute of said data area.

\* \* \* \* \*